March 19, 1957     H. KÖHLER     2,785,602
THREE LENS APOCHROMATIC OBJECTIVE OF TWO COMPONENTS
Filed April 27, 1955
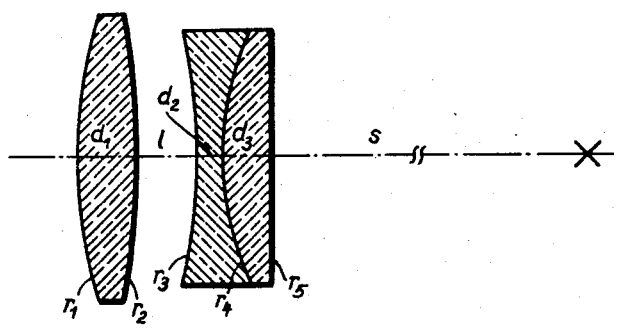

2,785,602
Patented Mar. 19, 1957

2,785,602

THREE LENS APOCHROMATIC OBJECTIVE OF TWO COMPONENTS

Horst Köhler, Heidenheim (Brenz), Germany, assignor to Carl Zeiss, Heidenheim (Brenz), Germany Application April 27, 1955, Serial No. 504,279

Claims priority, application Germany May 3, 1954

2 Claims. (Cl. 88—57)

The present invention is relative to an improvement of three-lensed apochromatic objectives, comprising two converging lenses, which enclose a diverging lens. Apochromatic objectives containing three lenses have been known for a long time. Objectives of this type are corrected for the image defects of spherical longitudinal deviation, sine condition, chromatic longitudinal deviation for two colours of the spectral range and also for a third colour, the so-called secondary spectrum. Neglecting the thicknesses, the following equation as a condition for obtaining the chromatic correction results from the theory for the elimination of the chromatic longitudinal aberration for two colours:

$$\frac{\varphi_1}{\nu_1}+\frac{\varphi_2}{\nu_2}+\frac{\varphi_3}{\nu_3}=0 \qquad (1)$$

therein $\varphi_1$, $\varphi_2$, $\varphi_3$ being the power of refraction of the single lenses and $\nu_1$, $\nu_2$, $\nu_3$ the so-called Abbé numbers, i. e. the relative reciprocal chromatic longitudinal aberration for each single lens I, II, III with respect to two colours.

If the indices $\varphi_1$ and $\varphi_3$ designate values belonging to the convergent lenses I and III, $\varphi_2$ those to the divergent lens II, N the resulting Abbé number of the two convergent lenses, i. e. the resulting reciprocal chromatic longitudinal aberration for the two lenses I, III with respect to two colours $$N=\frac{\varphi_1+\varphi_3}{\frac{\varphi_1}{\nu_1}+\frac{\varphi_3}{\nu_3}} \qquad (2)$$

and $$\varphi_{13}=\varphi_1+\varphi_3 \qquad (3)$$

the resulting power of refraction of same, the following equation may be set:

$$\frac{\varphi_{13}}{N}+\frac{\varphi_2}{\nu_2}=0 \qquad (4)$$

For the correction of the secondary spectrum, i. e. the elimination of the colour longitudinal aberration for a third colour, beside Equations 1 and 4 the following equation must govern:

$$\theta=\frac{\frac{\varphi_1\delta_1}{\nu_1}+\frac{\varphi_1\delta_3}{\nu_3}}{\frac{\varphi_1}{\nu_1}+\frac{\varphi_3}{\nu_3}}=\delta_2 \qquad (5)$$

In the above, $\delta_1$, $\delta_2$ and $\delta_3$ are the relative partial dispersions of lenses I, II and III. If these relative partial dispersions are related to colour G' as third colour, the following results:

$$\delta=\frac{n_{G'}-n_C}{n_F-n_C} \qquad (6)$$

$n_C$, $n_F$, $n_{G'}$ being the refractive figures for the Fraunhofer lenses C, F, G'. $\theta$ in (5) designates the resulting relative partial dispersion of the two convergent lenses I and III. A precondition for satisfying Equation 5 is the requirement that the relative partial dispersions of all three lenses are not allowed to answer one and the same linear relation of $$\delta=A+B\nu \qquad (7)$$

i. e. for one of the three lenses it must be possible to show relative partial dispersion with another constant than applicable to the other two lenses in dependence from $\nu$.

In order to satisfy these requirements the so-called "short-flint glasses" in combination with crown glasses have been used up to now. The refractive index of all these glasses used up to now for apochromats are under 1.600 and in accordance with Equation 4 give a resulting $\nu$-value N, which differs only little from $\nu_2$. Since beside Equation 3 the "power of refraction equation"

$$\varphi_{13}+\varphi_2=\Phi \qquad (8)$$

($\Phi$=total power of refraction required of the objective) also must be satisfied, the use of glass types for apochromats hitherto employed means that the absolute amounts of the power of refraction of $\varphi_1$, $\varphi_2$, $\varphi_3$ would have to be very large in comparison to $\Phi$. This resulted in the fact that these apochromatic objectives had a strong Gauss error (chromatic difference of spherical aberration) and a strong zonal aberration of the spherical longitudinal aberration. Serviceable apochromats of this kind have therefore been known only for apertures smaller than 1:10. The invention is based on the discovery made upon systematically examining optical glasses molten in the past years that especially the more recent "heavy flint glasses" with a refractive index of greater than 1.61 and a $\nu$-value smaller than 35 also show $\delta$-values whose slope deviates from the normal linear function $A+B\nu$ of the other optical glasses.

The invention consists in that in a three-lens apochromatic objective consisting of two convergent lenses which enclose a divergent lens, the convergent lens placed as rear lens is cemented to said divergent lens and said cemented component is separated from the other said convergent lens by an air space, that furthermore the one said convergent lens as well as the said divergent lens are made of glasses whose Abbé number $\nu$ are smaller than 35 and whose relative partial dispersion $$\delta=\frac{n_{G'}-n_C}{n_F-n_C}$$

are greater than 1.61 and that finally the divergent lens with respect to the one of both said convergent lenses has a difference in the refractive index of less than 0.05 and with respect to the other said convergent lens of more than 0.1 for the yellow helium line $d$.

For reasons of correcting the image aberrations viz. of the longitudinal spherical aberration, of the offence against the sine condition, and of the chromatic aberrations named above, as well as for reasons of reducing some manufacturing difficulties inherent in cemented triplets, it has prooved especially suitable, according to the invention, to cement the divergent lens merely with one of said convergent lenses and to leave an air space between said cemented doublet and the other said convergent lens such that the single convergent lens is placed in front position of the system regarding the incidence of light. An especially good correction of the chromatic aberrations results in that, according to the further development of the principle of the invention, the single convergent lens is a lens with the lower refractive index, and that this index is greater than 1.6 and the Abbé number is greater than 55.

According to the invention it suffices if the air space is greater than 2% of the focal length of the objective. Preferably it may amount to approximately 6% of this focal length. Likewise these modifications, according to the invention, result in a shortening of the total length of the telescope, in which the objective is used.

The numerical values given in the table below are relative to an example of an objective according to the invention, which is also illustrated in the figure of the drawing herewith attached. In other modifications of the invention, beside this numerical example, modifications may have e. g. the single convergent element made of glass of a higher refractive index than the convergent element cemented to the divergent element.

In the following numerical example there are designated

By $r$ the radii of the refracting surfaces,
By $d$ the thicknesses of the individual lens elements $L_1$, $L_2$ and $L_3$,
By $l$ the airspace between lens elements $L_1$ and $L_2$,
By $s$ the intercept from the lens apex nearest the image to the focal plane
By $n_d$ the refractive indices,
By $\nu$ the Abbé numbers.

All numerical values refer to the focal length $f=1$.

*Example*

|  | Lens I | Lens II | Lens III |
|---|---|---|---|
| $n_C$ | 1.6173 | 1.7473 | 1.7760 |
| $n_d$ | 1.6204 | 1.7552 | 1.7847 |
| $n_F$ | 1.6276 | 1.7747 | 1.8065 |
| $n_{G'}$ | 1.6334 | 1.7920 | 1.8261 |
| $\nu_d$ | 60.3 | 27.5 | 25.7 |
| $\delta$ | 1.566 | 1.631 | 1.644 |

$d_1=0.057 \quad d_2=0.024 \quad d_3=0.047$
$l_1=0.061$
$r_1=+0.48001 \quad r_3=-0.55431$
$r_2=-0.80584 \quad r_4=+0.29427 \quad r_5=-33.497$
$s=+0.795$

I claim:

1. Three-lens apochromatic objective consisting of two convergent lenses which enclose a divergent lens of biconcave shape, the one said convergent lens located at the rear position of the objective being cemented with said divergent lens and said front cemented doublet being separated from the said front convergent lens of biconvex shape by an air space, the said rear convergent lens as well as the said divergent lens being made of glasses whose Abbé number $\nu$ is smaller than 35 and whose relative partial dispersion $$\delta = \frac{n_{G'} - n_C}{n_F - n_C}$$

is greater than 1.61, the said divergent lens with respect to the said rear convergent lens having a difference in the refractive index of less than 0.05 and with respect to the said front convergent lens of more than 0.1 for the yellow helium line $d$, the said single front convergent lens being made of a glass having lower refractive index than either of said lens elements of said cemented doublet and amounting to at most 1.6 and the Abbé number of the glass amounting to at least 55, and the radii ($r_1 \ldots r_5$) of the refractive surfaces of the individual lens elements beginning with the front surface of the said single convergent lens having values lying between $$0.4 \cdot f < r_1 < 0.7 \cdot f$$
$$0.5 \cdot f < r_2 < 0.9 \cdot f$$
$$0.4 \cdot f < r_3 < 0.7 \cdot f$$
$$0.15 \cdot f < r_4 < 0.35 \cdot f$$
$$r_5 > 1.5 \cdot f$$

and the said air space ($l$) amounting to between $$0.02 \cdot f < l < 0.06 \cdot f$$

$f$ being the focal length of the objective.

2. An objective according to claim 1, the surface refractive powers ($\Delta n/r$) deviating each by at most $\pm 0.2/f$ from the values to be taken from the following numerical example:

| Radii | Thicknesses | $n_d$ | $\nu_d$ | $\Delta n/r$ |
|---|---|---|---|---|
| $r_1=+0.48001 \cdot f$ | $d_1=0.057 \cdot f$ | 1.6204 | 60.3 | $+1.2925/f$ |
| $r_2=-0.80584 \cdot f$ | $l=0.061 \cdot f$ |  |  | $+0.7699/f$ |
| $r_3=-0.55431 \cdot f$ | $d_2=0.024 \cdot f$ | 1.7552 | 27.5 | $-1.3624/f$ |
| $r_4=+0.29427 \cdot f$ |  |  |  | $+0.1002/f$ |
| $r_5=-33.497 \cdot f$ | $d_3=0.047 \cdot f$ | 1.7847 | 25.7 | $+0.0234/f$ | wherein are designated

With $r$ the radii of the refractive surfaces,
With $d$ the thicknesses of the individual lens elements $L_1$, $L_2$ and $L_3$,
With $l$ the airspace between lens elements $L_1$ and $L_2$,
With $s$ the intercept from the lens apex nearest the image to the focal plane,
With $n_d$ the refractive indices,
With $\Delta n/r$ the mean refractive powers of the individual lens surfaces.

References Cited in the file of this patent

UNITED STATES PATENTS

| | | |
|---|---|---|
| 415,040 | Hastings | Nov. 12, 1889 |
| 554,737 | Schroeder | Feb. 18, 1896 |
| 576,896 | Rudolph | Feb. 9, 1897 |
| 635,473 | Goerz et al. | Oct. 24, 1899 |
| 682,017 | Aldis | Sept. 3, 1901 |
| 775,353 | Von Rohr | Nov. 22, 1904 |
| 2,417,942 | Miles | Mar. 25, 1947 |